No. 712,236. Patented Oct. 28, 1902.
L. ATWOOD.
SPARK ARRESTER.
(Application filed Feb. 18, 1902.)
(No Model.)
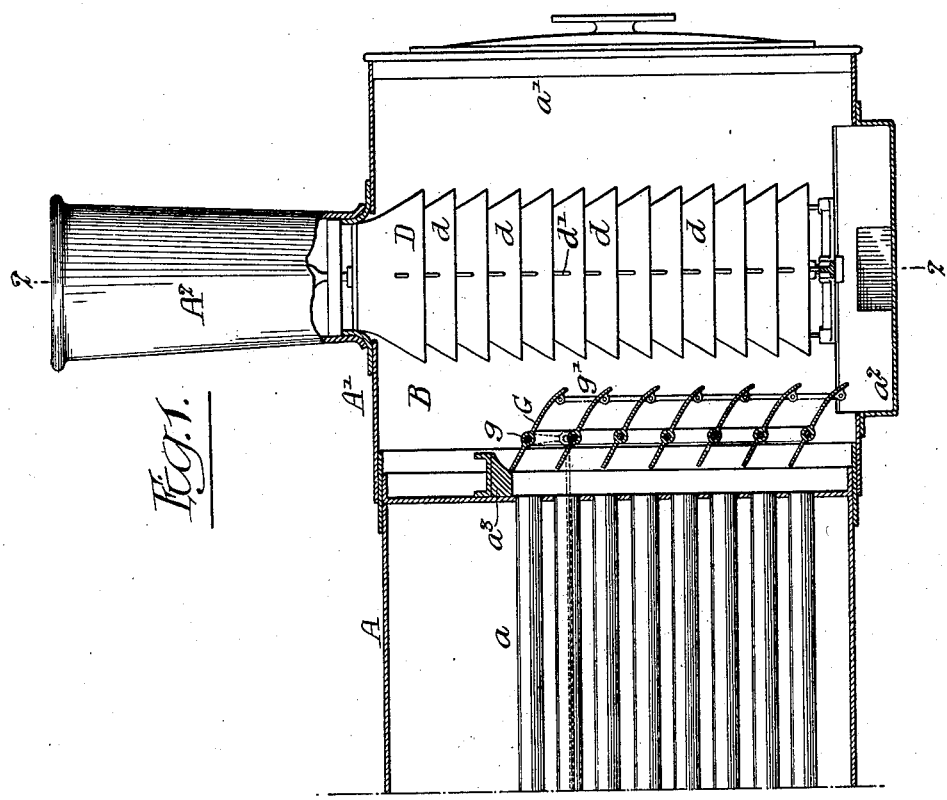
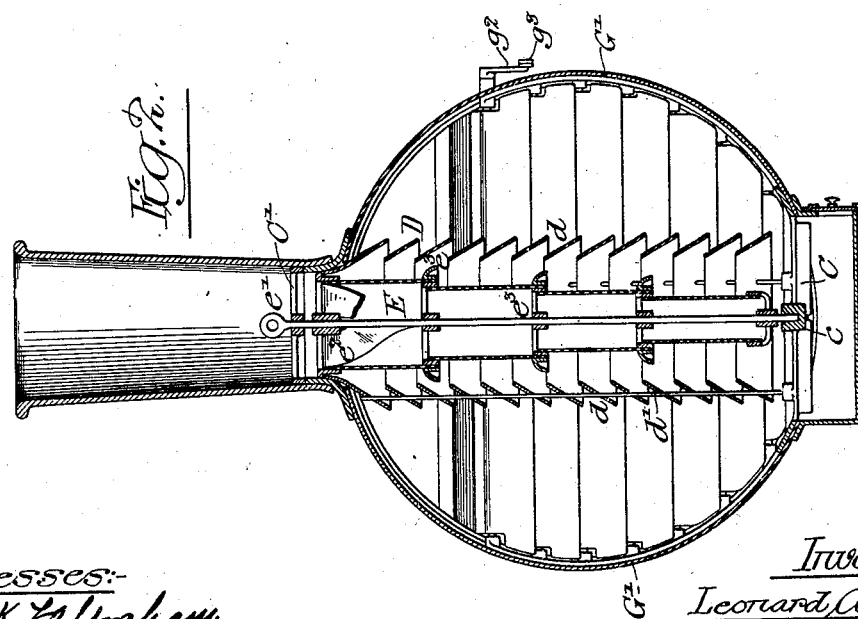
Witnesses:-
Inventor:-
Leonard Atwood,
by his Attorneys;
THE NORRIS PETERS CO., PHOTO-LITHO., WASHINGTON, D. C.

UNITED STATES PATENT OFFICE.

LEONARD ATWOOD, OF PHILADELPHIA, PENNSYLVANIA.

SPARK-ARRESTER.

SPECIFICATION forming part of Letters Patent No. 712,236, dated October 28, 1902.

Application filed February 18, 1902. Serial No. 94,629. (No model.)

*To all whom it may concern:*

Be it known that I, LEONARD ATWOOD, a citizen of the United States, residing in Philadelphia, Pennsylvania, have invented certain Improvements in Spark-Arresters, of which the following is a specification.

The main object of my invention is to so construct a spark-arrester for locomotives that the heavy particles of the products of combustion issuing from the boiler-tubes will be collected in the base of the smoke-box.

A further object of the invention is to automatically clean the screens through which the products of combustion pass, and a still further object is to regulate the passage of the products of combustion from the furnace.

In the accompanying drawings, Figure 1 is a longitudinal sectional view of sufficient of the front end of a locomotive to illustrate my invention; and Fig. 2 is a section on the line 2 2, Fig. 1.

A is a locomotive-boiler having tubes $a$.

A' is the smoke-box, having the usual door $a'$, and in the bottom of the smoke-box is the collecting-pan $a^2$, in which the cinders and particles separated from the products of combustion are cooled.

B is a vertically-arranged tubular deflector composed of a series of conically-shaped rings $d$, sufficiently spaced apart to allow the products of combustion to pass between the several rings and into the interior of the deflector. The rings are mounted on rods $d'$, supported by a spider C directly above the box $a^2$.

Within the deflector B is a screen E. This screen is made up of a number of sections $e$, preferably of different diameters, the several sections $e$ being mounted on a rod $e'$, stepped in a bearing in the ring C', resting within the stack $A^2$.

It will be noticed that there is sufficient lost motion between the bearings C C' so that the screen will have a limited vertical motion. This is for the purpose of disengaging any cinders or particles that may cling to the screen as the products of combustion pass through it, thus keeping the screen perfectly clean. In order to aid this action, I preferably mount spiral blades $e^2$ in one of the screen-sections. I have shown in the drawings the upper screen-section having blades.

The action of the blast of the furnace will tend to turn the screen as well as lift it, so that the screen-section will turn on its axis and present a new surface to the products of combustion as they pass to the stack. Thus one side is being cleaned while the other is screening the cinders. Any additional arrangement may be provided for causing the screen to turn, and in some instances the screen may be so mounted that it will only have a rotary motion.

The screen-sections are made decreasing in diameter, the smaller sections being at the lower end and the larger sections at the upper end, and these several sections are separated by rings $e^3$, having spider-bearings through which the rod or shaft $e'$ passes. The upper end of the rod is provided with an eye or hook, so that the entire screen can be withdrawn readily from the stack when necessary and readily replaced without dismantling the entire apparatus.

In front of the tubes of the boiler I preferably arrange a series of deflectors G. Each of these deflectors is pivoted at $g$ and connected together by a rod or links $g'$, and one of the pivots extends outside of the casing of the smoke-chamber and is provided with a lever $g^2$, connected to the rod $g^3$, preferably leading to the cab of the locomotive. Each of the deflectors G is pivoted to segments G' on each side of the smoke-box and are free to be turned on their pivots by operating the rod $g^3$. The ends of the deflectors G are preferably curved downward, as shown in Fig. 1, and above the upper deflector is a bar $a^3$ to prevent the products of combustion passing upward over the upper deflector.

It will be seen by the above arrangement that I can regulate the deflection of the products of combustion by simply turning the several deflectors G, as described.

I preferably make the screen-sections of different mesh, the upper sections being a fine mesh and the lower sections a coarse mesh; but they may all be of the same mesh without departing from my invention.

The operation of the spark-arrester is as follows: If, for instance, the deflectors are set, as illustrated in the drawings, the products of combustion pass into the smoke-box from the flues and are directed downward by the deflectors G, and then they pass upward through the spaces between the conical deflecting-rings d of the deflector D, through the screens, and up into the stack. The heavier particles will naturally be collected in the box prior to reaching the screen, while the other particles are separated from the products of combustion and drop from the screen into the box. This box is provided with a suitable discharge-opening through which the collected cinders can be removed.

I claim as my invention—

1. The combination in a spark-arrester, of a smoke-box, a stack, a deflector within the box extending from the bottom thereof to the stack and made up of a series of conically-shaped rings suitably spaced, with a screen arranged within the deflector and tapered, said screen being smaller than the stack and detachably mounted, so that it can be removed through the stack without dismantling the deflector, substantially as described.

2. The combination in a spark-arrester, of a smoke-box, a stack, a deflector within the smoke-box in line with the stack, a screen mounted within the deflector below the stack, a bearing in the bottom of the box for the screen, and a bearing at the lower end of the stack, the said bearing in the stack being detachable so that the screen can be withdrawn through the stack, substantially as described.

3. The combination in a spark-arrester, of a smoke-box, a stack, a bearing in the bottom of the box, a bearing in the stack, a rod mounted in said bearings, and a screen consisting of a series of sections mounted on the rod, substantially as described.

4. The combination in a spark-arrester, of a smoke-box, a stack, a deflector mounted in the box in line with the stack and consisting of a series of conically-shaped rings separated to form upwardly-inclined passages, a screen mounted within the deflector and smaller than the stack, said screen being made up of a series of sections coupled together, with deflecting-rings at the junction of the several sections, the screen being hollow throughout its length, substantially as described.

5. The combination of a smoke-box, a stack, an annular deflector within the box in line with the stack and made up of a series of conically-shaped rings separated to form upwardly-inclined passages, a screen mounted within the deflector in line with the stack, and a series of deflectors within the smoke-box in front of the tubes and arranged to deflect the products of combustion downward before they reach the conical deflector, substantially as described.

6. The combination of a smoke-box, a stack, with a screen loosely mounted in the smoke-box so that it will have a limited vertical movement for disengaging the particles of cinder that may collect on the screen, substantially as described.

7. The combination of a smoke-box, a stack above the smoke-box, a cylindrical screen within the smoke-box under the stack, pivots for said screen, with means for causing the screen to turn by the action of the blast as it passes from the flues to the stack, substantially as described.

8. The combination of a smoke-box of a locomotive or other boiler, a stack, a screen mounted in the smoke-box in line with the stack, upper and lower bearings for the screen, the screen being loosely mounted in the bearings so that it will have a limited vertical movement, said screen being free to turn, with blades on the screen for causing it to turn by the action of the draft, substantially as described.

In testimony whereof I have signed my name to this specification in the presence of two subscribing witnesses.

LEONARD ATWOOD.

Witnesses:
WILL. A. BARR,
JOS. H. KLEIN.